April 28, 1970   R. K. ALLGEIER, JR   3,508,739
METAL VALVE PINTLE WITH ENCAPSULATED ELASTOMERIC BODY
Filed Oct. 17, 1968
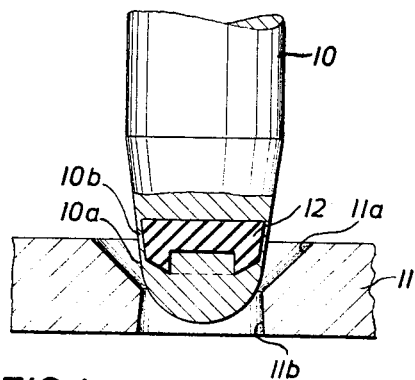
FIG. 1
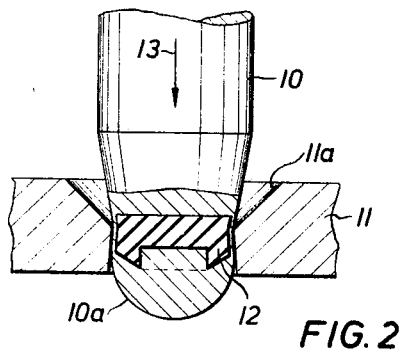
FIG. 2
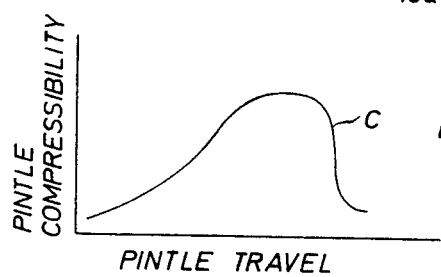
FIG. 3
FIG. 4
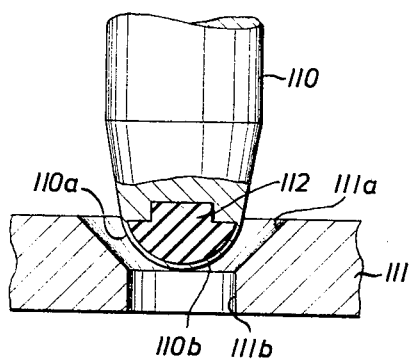
FIG. 5
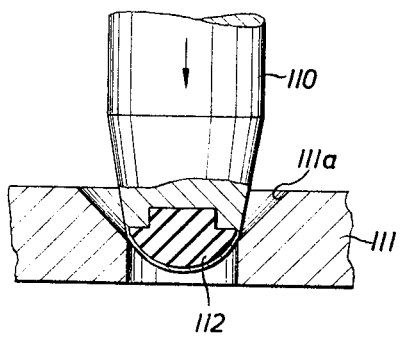
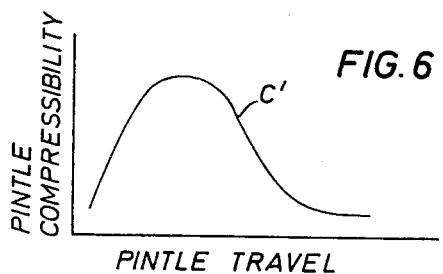
FIG. 6
Robert K. Allgeier, Jr.
INVENTOR.
BY
ATTORNEY

United States Patent Office 3,508,739
Patented Apr. 28, 1970

3,508,739
METAL VALVE PINTLE WITH ENCAPSULATED ELASTOMERIC BODY
Robert K. Allgeier, Jr., Houston, Tex., assignor to the United States of America as represented by the Administrator of the National Aeronautics and Space Administration
Filed Oct. 17, 1968, Ser. No. 768,336
Int. Cl. F16k 25/00
U.S. Cl. 251—358                          15 Claims

ABSTRACT OF THE DISCLOSURE

An elastomeric body having a predetermined configuration is completely encapsulated within one contoured end of a metal shaft which moves axially to meet and close an apertured, correspondingly contoured metal seat. The shaft and elastomeric body are deformed in relation to the mating contours of the seat and shaft which in turn is related to the length of axial travel of the shaft into the seat to thereby provide a controllable, variable sealing force. The elastomeric body also acts to restore the original shaft contour when the shaft is retracted from the seat.

---

The invention described herein was made by an employee of the United States Government and may be manufactured and used by or for the Government for governmental purposes without the payment of any royalties thereon or therefor.

BACKGROUND OF THE INVENTION

Field of the invention

The present invention relates generally to the field of valve closure means and more particularly to an improved valve pintle construction for forming a metal-to-metal valve closure.

Brief description of the prior art

Where values are employed in systems carrying corrosive, cryogenic, or reactive fluids, it may be necessary to employ metal valve components rather than so-called "soft sealing" components such as rubber. While metal valve components are less susceptible to harm from such chemicals, they are subject to being distorted when strong forces are employed in seating the closure members to obtained zero leakage, and as a result, leakage may develop when the distorted valve surfaces are subsequently reclosed.

The prior art has suggested the use of elastomeric material encapsulated within one of the metal closure elements to obviate the effects of the corrosive or reactive fluids passing through the valve while also providing a restoring force which tends to reshape the closure element of the valve to its undistorted condition. A valve employing this technique is exemplified in U.S. Patent No. 1,553,056 issued to Warter which discloses a resilient body encapsulated within a lead closure member. Another valve employing the general principle of encapsulating a resilient body in a metal closure member is disclosed in U.S. Patent No. 2,969,218 issued to Shaw. One of the closure members of the Shaw valve includes a resilient insert carried within a metal cavity which compensates for deformation in the seating surfaces and prevents cold flow of the insert. Other examples of valve closure elements which employ resilient material acting in conjunction with a surrounding protective metal surface may also be found in U.S. Patents No. 326,613; 591,886 and 1,250,433.

While the basic principle of metal encapsulation of an elastomer is incorporated in the prior art cited hereinbefore, none of the references disclose means for accurately controlling the effective closure force exerted between mating valve components. In all of the cited prior art devices, the elastomeric component is designed primarily to provide a uniformly directed force against the mating closure surfaces and to restore the original shape of the closure member when the valve is opened. However, in the prior art devices, an increase or decrease in the amount of force used to close the valve surfaces does not necessarily result in a corresponding increase or decrease in the amount of compression of the valve member and the enclosed elastomeric body. As a result, where the closure force is related to the travel of the movable valve member, the compression of the member and the encapsulated elastomer bears no controllable relation to such travel, and consequently, increased travel of the movable valve member does not necessarily result in a superior seal.

A predetermined seating or closure is often required where the valve is subject to back pressure. In such applications, it may be desirable that the seating force increase slowly with the amount of valve travel to some maximum value with a subsequent rapid decrease in seating force associated with further travel. On the other hand, where the valve is subject to forward pressure, it is often desirable to have a rapidly increasing seating force with only a relatively small amount of valve travel and a subsequent, slowing decreasing seating force with continued travel. It is apparent from a study of the prior art devices cited hereinbefore that such devices provide no means for effecting a variable closing force which may be accurately controlled.

SUMMARY OF THE INVENTION

The valve of the present invention includes a fixed metal closure member and a movable metal closure member, or pintle, with an elastomeric body encapsulated within the contoured sealing surface of the pintle. The elastomeric body is thus protected from the harmful effects of reactive, cryogenic, or corrosive fluids by the metal pintle covering. The fixed closure member is also constructed of metal and is provided with an apertured seat which is adapted to receive the correspondingly contoured sealing surface of the pintle. The encapsulated elastomeric body is shaped to provide a variable lateral cross section which in turn produces a variable force acting against the seat of the fixed closure member as the valve pintle is advanced or retracted.

When the pintle is forced against the apertured seat, the metal of the pintle is distorted to precisely conform to the surface of the seat to thereby produce an extremely effective metal-to-metal seal. The elastomeric body simultaneously acts to evenly distribute the closing force about the entire seating surface and to vary the force exerted against the seat as a predetermined function of pintle travel. When the pintle is disengaged from the seat, the elastomeric body restores the deformed pintle to its original shape. Thereafter, the pintle may be reclosed and again deformed to match the seating surface of the fixed closure member without danger or incomplete sealing caused by deformation of the pintle during previous seatings.

By providing for a variation in the force exerted by the pintle and encapsulated elastomeric body as they are compressed and correlating such variation to the travel of the pintle, a more effective, controllable seal may be obtained.

BRIEF DESCRIPTION OF THE DRAWING

FIG. 1 is a partial elevation, partly in section, illustrating one form of the valve of the present invention;

FIG. 2 illustrates the valve of FIG. 1 in a closed position;

FIG. 3 is a graph illustrting pintle travel vs. pintle compressibility for the valve of FIGS. 1 and 2;

FIG. 4 is a partial elevation, partly in section, illustrating a second form of the valve of the present invention;

FIG. 5 illustrates the valve of FIG. 4 in a closed position; and

FIG. 6 is a graph illustrating pintle travel vs. pintle compressibility, for the valves of FIGS. 4 and 5.

DESCRIPTION OF THE PREFERRED FORMS OF THE INVENTION

With reference to FIG. 1, it may be seen that the valve of the present invention includes a movable valve stem or pintle 10 which is adapted to engage with and seal over a fixed seating member 11. The pintle 10 and seating member 11 are constructed of metal such as steel or other suitable material. The lower axial portion of the pintle 10 includes a smooth contoured surface 10a which is adapted to be received within a coaxially developed frusto-conical seating surface 11a and inverted frusto-conical bore 11b formed in the fixed seating member 11.

An elastomeric body 12, in the form of an inverted cup, is encapsulated within the pintle 10 and is partially surrounded by a thin metal wall 10b. The elastomeric body 12 may be constructed of rubber, resilient plastic or any other suitable material.

With reference to FIG. 2, it may be seen that pintle 10 is compressed by the seating member 11 as the pintle moves along the common axis of the two components in the direction of the arrow 13. The relationship between the amount of pintle travel and the compressibility of the pintle is illustrated in graph form in FIG. 3, with travel in a downward direction increasing to the right and pintle compressibility increasing upwardly. The curve C of FIG. 3 illustrates a slow increase in the compressibility of the pintle during its initial downward travel. The peak of the curve, representing maximum compressibility occurs when the pintle 10 is approximately in the position illustrated in FIG. 2. Further downward movement of the pintle results in a rapid decrease in the amount of pintle compressibility as indicated by the falling curve. From the foregoing it may be appreciated that the elastomeric body 12 cooperates with the contour of the pintle surface 10a to effect a variable force against the seating surface 11a and bore 11b as a function of pintle travel. It may also be appreciated that the seating contours of the two members 10 and 11 cooperate to provide a variable contact area which is also a function of pintle travel.

The variation in pintle compressibility is related to the shape of the elastomeric body 12 as may be illustrated by reference to FIG. 2 where the lateral cross section of the body 12 is seen to increase axially upwardly. During the initial movement of the pintle, the volume of elastomeric material subject to compression is relatively small. As the pintle moves further into the seating member 11, the volume of elastomer increases to permit greater deformation of the pintle and, above the body 12, the compressibility rapidly decreases.

The pintle and elastomer illustrated in FIGS. 1 and 2 permit an increased area of metal-to-metal contact between the valve members 10 and 11 which is particularly suited for sealing against back pressures which tend to drive the pintle upwardly. This effect may be enhanced by forming the bore 11b into the inverted frusto-conical surface illustrated since in such case the tip of pintle 10 can "balloon" back against the sealing surface.

FIGS. 4 and 5 of the drawings illustrate a second form of the valve of the present invention which is designed for forward pressure application where the pressure of the gas or fluid to be sealed off tends to drive the pintle down against the fixed seat. The second form of the invention includes a pintle 110, fixed seating member 111 and an encapsulated elastomeric body 112. The lower axial portion of the pintle 110 is provided with a smooth seating surface 110a and a relatively narrow wall 110b covering the elastomeric body 112. The fixed seating member 111 includes a frusto-conical seating surface 111a and a cylindrical bore 111b.

The elastomeric body 112 is in the form of a mushroom to provide relatively large compressibility of the pintle 110 during its initial movement against the surfaces of the seat 111a and bore 111b and a reduction in its compressibility as it travels farther into the fixed member 111. The lateral cross sectional area of the elastomeric body 112 initially increases axially upwardly followed by a sharp reduction in cross sectional area. The graph of FIG. 6 illustrates the resulting relationship between pintle travel and compressibility for the valve illustrated in FIGS. 4 and 5. During the initial downward travel of the pintle 110, a small movement of the pintle produces a relatively large increase in its compressibility as indicated by the curve C'. Further movement drives the region of maximum compressibility into the fixed sealing member 111 which corresponds with the position of the pintle 110 illustrated in FIG. 5. Continued downward movement produces a rapid decrease in compressibility as indicated by the fall in the curve C' in FIG. 6.

In both of the embodiments of the present invention, it will be understood that in addition to providing for variable pintle compression, the elastomeric body also acts to equalize the forces exerted by the pintle against the fixed seating surfaces and also restores the pintle shape when it is disengaged from the fixed seating member. It will also be understood that elastomeric bodies having configurations other than those specifically illustrated herein may be employed without departing from the present invention. Moreover, the specific contour of the mating sealing surfaces may be altered from those illustrated herein to produce the desired amount of compression of one of the sealing members as a function of its travel. By way of further example, it is also within the contemplation of the present invention to encapsulate the elastomeric body within the fixed sealing member rather than the movable member.

The foregoing disclosure and description of the invention is illustrative and explanatory thereof, and various changes in the size, shape, and materials as well as in the details of the illustrated construction may be made within the scope of the appended claims without departing from the spirit of the invention.

I claim:
1. A valve comprising:
 (a) first and second metal closure means;
 (b) moving means for moving said first closure means relative to said second closure means; and
 (c) resilient means encapsulated within said first metal closure means for discretely causing the compressibility of said first closure means to reach an extreme at specific locations as a predetermined function of the relative movement between said first and second closure means.

2. The valve as recited in claim 1 wherein:
 (a) said first closure means is provided with a first convex seating surface and said second closure means is provided with a second concave seating surface;
 (b) said moving means includes means for moving said first and second seating surfaces into and out of physical engagement with each other for varying the area of surface contact between said seating surfaces; and
 (c) said resilient means comprises an elastomeric body having a variable lateral cross sectional area which increases and thereafter remains constant along a portion of the axial development of said elastomeric body.

3. The valve as defined in claim 2 including means for uniformly increasing the compressibility of said first closure means during a first portion of its movement toward said second closure means and for decreasing the compressibility of said first closure means during continued movement in the same direction.

4. The valve as defined in claim 1 including means for uniformly increasing the compressibility of said first closure means during a first portion of its movement toward said second closure means and for decreasing the compressibility of said first closure means during continued movement in the same direction.

5. The valve as defined in claim 4 further including means for varying the amount of surface contact between said convex and concave seating surfaces.

6. The valve as recited in claim 1 wherein:
 (a) said first closure member includes a convex sealing surface;
 (b) said second closure member includes a concave sealing surface having a common axis of development with said convex sealing surface; and
 (c) said moving means includes means for moving said convex sealing surface axially along said common axis of development and into engagement with said convex surface.

7. The valve as defined in claim 6 including a second inverted concave sealing surface formed below said first named concave sealing surface on said second closure member and having a common axis of development with said convex sealing surface.

8. The valve as defined in claim 6 further including a cylindrical seating surface formed below said concave seating surface on said second closure member and having a common axis of development with said convex seating surface.

9. The valve as defined in claim 6 including means for varying the amount of surface contact between said convex and concave sealing surfaces.

10. The valve as defined in claim 9 further including a second inverted concave sealing surface formed below said first named concave sealing surface on said second closure member and having a common axis of development with said convex sealing surface.

11. The valve as recited in claim 6 wherein said resilient means comprises an elastomeric body having an increasing lateral cross sectional area taken along said common axis of development in a direction from said concave surface to said convex surface.

12. The valve as defined in claim 11 further including a second inverted concave sealing surface formed below said first named concave sealing surface on said second closure member and having a common axis of development with said convex sealing surface.

13. The valve as recited in claim 6 wherein said resilient means comprises an elastomeric body having an increasing lateral cross sectional area followed by a decreasing lateral cross sectional area taken along said common axis of development in a direction from said concave surface to said convex surface.

14. The valve as defined in claim 13 including means for varying the amount of surface contact between said convex and concave sealing surfaces.

15. The valve as defined in claim 13 further including a cylindrical seating surface formed below said concave seating surface on said second closure member and having a common axis of development with said convex seating surface.

References Cited

UNITED STATES PATENTS

| | | | |
|---|---|---|---|
| 269,531 | 12/1882 | McGinley | 251—321 |
| 326,613 | 9/1885 | Whittaker | 251—358 |
| 347,914 | 8/1886 | Blackburn | 251—358 |
| 591,886 | 10/1897 | Schrader | 251—358 |
| 630,184 | 8/1899 | Cooke | 251—322 |
| 1,250,433 | 12/1917 | Comings | 251—358 XR |
| 1,381,175 | 6/1921 | Ericsson | 137—375 XR |
| 1,403,263 | 1/1922 | Mueller et al. | 251—318 |
| 1,553,056 | 9/1925 | Warter | 251—358 |
| 3,070,116 | 12/1962 | Noland et al. | 251—333 XR |
| 3,145,733 | 8/1964 | Shaw et al. | 132—612.1 XR |

SAMUEL SCOTT, Primary Examiner

U.S. Cl. X.R.

251—333